(12) United States Patent
Levine et al.

(10) Patent No.: US 10,579,692 B2
(45) Date of Patent: Mar. 3, 2020

(54) COMPOSITE KEYS FOR MULTI-TENANT NON-RELATIONAL PLATFORM OBJECTS

(71) Applicant: salesforce.com, inc., San Francisco, CA (US)

(72) Inventors: Eli Levine, San Francisco, CA (US); Samarpan Jain, Fremont, CA (US); James Ferguson, San Francisco, CA (US); Jan Asita Fernando, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 193 days.

(21) Appl. No.: 15/717,788

(22) Filed: Sep. 27, 2017

(65) Prior Publication Data

US 2019/0095534 A1 Mar. 28, 2019

(51) Int. Cl.
*G06F 16/9535* (2019.01)
*G06F 16/901* (2019.01)
*G06F 16/9038* (2019.01)

(52) U.S. Cl.
CPC ........ *G06F 16/9535* (2019.01); *G06F 16/901* (2019.01); *G06F 16/9038* (2019.01)

(58) Field of Classification Search
CPC . G06F 16/9535; G06F 16/901; G06F 16/9038
USPC ....................................................... 707/722
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Evan Aspinwall
(74) *Attorney, Agent, or Firm* — Weaver Austin Villeneuve & Sampson LLP

(57) ABSTRACT

Disclosed are examples of systems, apparatus, methods and computer program products for providing a web application builder framework in a database system. A database system maintains a multi-tenant non-relational database associated with a number of enterprises, a number of records, and a number of data objects for each of the enterprises. A dynamic virtual table is maintained as well, associated with the number of records and number of data objects. A user request is received to define a composite key for a data object. A metadata model is generated representing the data object, and a data definition script is generated. The dynamic virtual table is updated to include one or more virtual columns corresponding to the data definition script, and one or more columns of a shared table in the non-relational database are updated to match the virtual columns.

20 Claims, 10 Drawing Sheets

(56) References Cited

U.S. PATENT DOCUMENTS

| | | | |
|---|---|---|---|
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B2 | 6/2006 | Cinarkaya et al. | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 10,169,446 B1 * | 1/2019 | Garlapati | G06F 16/284 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0091702 A1 | 7/2002 | Mullins et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2006/0026168 A1* | 2/2006 | Bosworth ................. G06F 8/60 |
| 2006/0117073 A1* | 6/2006 | Bosworth ............. G06F 16/273 |
| 2006/0294098 A1* | 12/2006 | Thomson ............ G06F 16/2465 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0210631 A1* | 8/2009 | Bosworth ........... G06F 12/0875 |
| | | 711/141 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0166472 A1 | 6/2013 | Brunswig et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0067772 A1 | 3/2014 | Sabbouh et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019535 A1* | 1/2015 | Weber ................... G06F 16/245 |
| | | 707/722 |
| 2015/0095162 A1 | 4/2015 | Jakobson et al. |
| 2015/0127670 A1 | 5/2015 | Torman et al. |
| 2015/0142596 A1 | 5/2015 | Jakobson et al. |
| 2015/0172563 A1 | 6/2015 | Jakobson et al. |
| 2015/0317331 A1* | 11/2015 | Thomas .................... G06F 8/35 |
| | | 707/792 |
| 2016/0041976 A1 | 2/2016 | Pradeep et al. |
| 2016/0188710 A1 | 6/2016 | Dulba Naik |
| 2017/0075922 A1 | 3/2017 | Torman et al. |
| 2017/0180211 A1* | 6/2017 | Johnson ................. H04L 67/10 |
| 2017/0262638 A1 | 9/2017 | Horowitz et al. |
| 2018/0025113 A1 | 1/2018 | Torman et al. |
| 2018/0095790 A1 | 4/2018 | Pradeep et al. |
| 2018/0096012 A1 | 4/2018 | Warshavsky et al. |
| 2018/0096013 A1 | 4/2018 | Warshavsky et al. |
| 2018/0096165 A1 | 4/2018 | Warshavsky et al. |
| 2018/0189328 A1* | 7/2018 | Frazier .................... G06F 16/25 |
| 2018/0196899 A1* | 7/2018 | Crabtree ........... G06Q 10/0637 |
| 2019/0095532 A1 | 3/2019 | Levine et al. |
| 2019/0095533 A1 | 3/2019 | Levine et al. |

OTHER PUBLICATIONS

U.S. Office Action dated Jul. 9, 2019 issued in U.S. Appl. No. 15/717,780.

* cited by examiner

Custom Index Definition

BigObject1477429286PK (Managed)

310

Custom Index Detail  Custom Indexes Fields
                        320

330 ▼ Information

| | | |
|---|---|---|
| Label | BigObject1477429286PK | Parent | BigObject1477429286 |
| Name | BigObject1477429286PK | Namespace Prefix | custidx7 |
| Type | Primary | | |

▼ System Information

| | | | |
|---|---|---|---|
| Created By | Admin User, 3/8/2017 5:43 PM | Last Modified By | Admin User, 3/8/2017 5:43 PM |

340

Custom Indexes Fields

| Field Label | API Name | Sort Direction |
|---|---|---|
| TextField0 | custidx7_cf0_c | Descending |
| DateTimeField2 | custidx7_cf2_c | Ascending |

350

Always show me ▼ more records per related list

∧ Back To Top

*FIGURE 3*

```
SELECT LastName_c, FirstName_c, PhoneNumber_c
FROM Phone_Book_b
WHERE LastName_c='Kelly' AND FirstName_c='Charlie' AND PhoneNumber_c='2155555555'
```
410

```
SELECT LastName_c, FirstName_c, PhoneNumber_c
FROM Phone_Book_b
WHERE LastName_c='Kelly' AND FirstName_c='Charlie'
```
420

```
SELECT LastName_c, FirstName_c, PhoneNumber_c
FROM Phone_Book_b
WHERE LastName_c='Kelly' AND PhoneNumber_c='2155555555'
```
430

*FIGURE 4*

- Attributes
- Fields (5)
  - custidx7__cf0__c
    - aggregatable: false
    - autoNumber: false
    - byteLength: 150
    - calculated: false
    - caseSensitive: false
    - createable: true
    - custom: true
    - defaultedOnCreate: false
    - deprecatedAndHidden: false
    - digits: 0
    - filterable: true
    - groupable: false
    - idLookup: false
    - label: TextField0
    - length: 50
    - name: custidx7__cf0__c
    - nameField: false
    - namePointing: false
    - nillable: false
    - permissionable: false
    - precision: 0
    - queryByDistance: false
    - restrictedPicklist: false
    - scale: 0
    - soapType: xsd:string
    - sortable: true
    - type: string
    - unique: false
    - updateable: false
  - custidx7__cf1__c
  - custidx7__cf2__c
  - custidx7__cf3__c
  - Id
- everything

COMPOSITE KEYS FOR MULTI-TENANT NON-RELATIONAL PLATFORM OBJECTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to non-relational database systems, and more specifically to providing composite keys in multi-tenant non-relational database schemas.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for providing composite keys in multi-tenant non-relational database schemas. These drawings in no way limit any changes in form and detail that may be made by one skilled in the art without departing from the spirit and scope of the disclosed implementations.

FIG. 3 shows an example of a composite key within a data object, in accordance with some implementations.

FIG. 4 shows an example of query statements for data objects with composite keys, in accordance with some implementations.

FIG. 6 shows an example of a representation of data object information provided to a user of a database environment, in accordance with some implementations.

DETAILED DESCRIPTION

Figure 1:
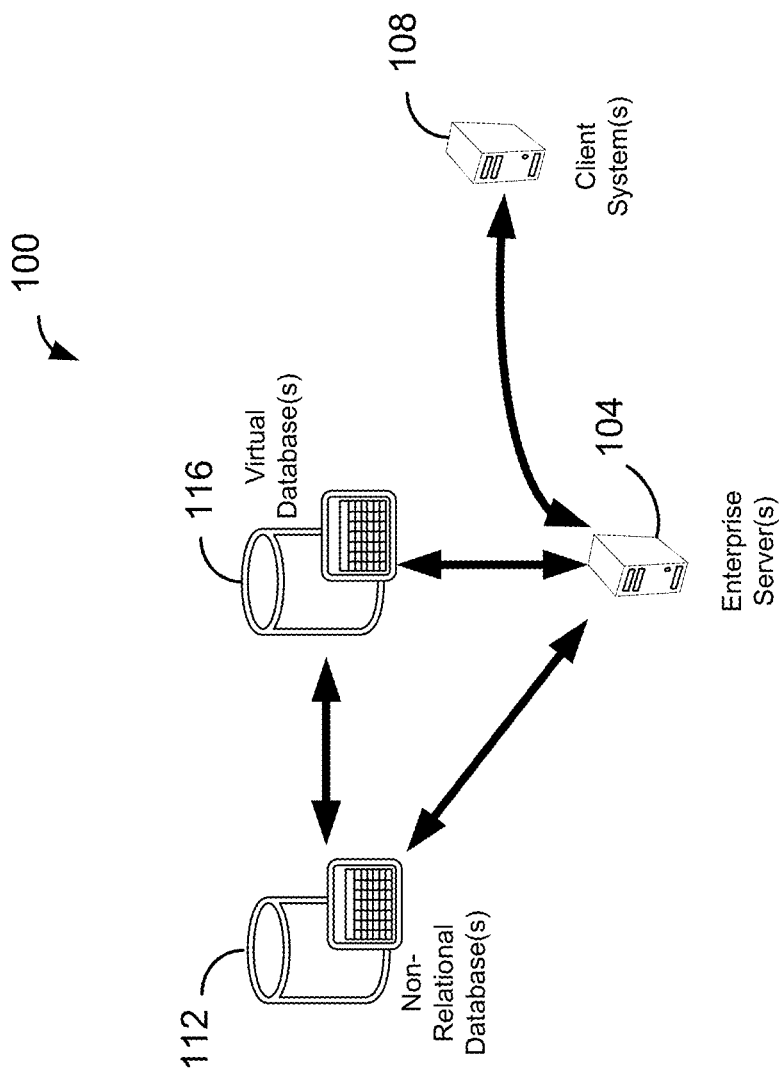
FIG. 1 shows a system diagram of an example of a system 100 for providing composite keys in multi-tenant non-relational database schemas, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing composite keys in multi-tenant non-relational database schemas.

In some multi-tenant database systems, a multi-tenant architecture is used wherein customer organizations (i.e., tenants) share database resources in one logical database. The database tables themselves are typically shared; each entity in the data model typically contains an organization_id or tenant_id column that distinguishes rows for each tenant. Queries and data manipulation in the context of a tenant are filtered through this tenant_id column, which is often indexed, to ensure proper security and the appearance of private databases. In the salesforce.com system, for example, this strategy is used to expose standard objects such as Account, Contact, Lead, and Opportunity to customers.

Traditionally, standard objects were used within shared tables in a relational database, such as Oracle. In such a table, a standard object may be shared among tens of thousands of customers per instance. When a table had to be fundamentally changed, such as adding a new field corresponding to a new object, or removing a field, it would present considerable problems. The relational database schema would have to be altered, including defining a new table, indexes, and more, at the physical level of the database. The database owner would not be free to make changes anytime; rather, the database would have to be locked down and altered only at certain times, resulting in a very expensive operation.

Advances have been made to remove this downtime. In this method, rather than defining a new physical table when you must add a field containing a new object, a row is added to a metadata table. The row indicates that a virtual table is storing the data in another table dynamically. At the physical database level, rows are merely being inserted, which is a low-cost and non-intrusive operation, requiring no downtime. An existing column is then updated in an existing table to add the new data. Thus, adding a field is part of application logic, rather than part of relational database schema changes.

Non-relational database systems have become very popular in recent years. Non-relational database systems are ideal for applications that need fast access to large amounts of data. They provide flexible, scalable database schemas for large datasets. One such non-relational database is HBase. HBase supports a primary key with multiple fields. Non-relational databases can lead to fast, real-time capturing of large amounts of data in logs. Rather than the strict structure of a traditional relational database, a non-relational database can provide for unstructured databases.

Frameworks exist to handle objects and schema management in an efficient, low-cost way within non-relational databases. However, such frameworks have focused on a single, pre-defined primary key for a given non-relational database table. Users can define one key per table. For example, an identification number can be pre-assigned to each record, and this field can be the primary key for the table. This is a typical relational database pattern to enable efficient single record lookup. In addition, secondary indices can be added to support alternative queries. In HBase, a composite key can provide both identity and queryability. However, for a multi-tenant database, there is no efficient way for an index to be created directly by customers within a shared, multi-tenant database; there is no efficient way for a given number of customers to share the database with multiple composite keys defined by the customers on every object the customers create, even though stored in a single shared HBase table. Such a solution would work almost as if each customer in the shared table had a unique table with its own composite keys for its own objects, and in addition, would involve removing the requirement for customers to handle complex metadata management, and allowing customers to gain visibility into what the composite key is for a given object.

By way of illustration, Acme is a company that runs a multi-tenant database system where thousands of organizations capture large datasets in real-time. Acme maintains a database within the database system for this data capture and storing. Within the database, Acme has several custom objects, each with multiple attributes. Acme would like to query these custom objects within the database system according to, for example, a user name or a sales figure. However, the nature of custom objects within their database system restricts the queries of these objects only based on a unique ID number. Therefore, Acme would not be able to query these objects in a way that makes practical sense for their sales needs.

Some of the disclosed techniques can be implemented to provide for defining a composite key for a platform object in a multi-tenant, non-relational database. An organization within a multi-tenant environment defines schema elements via a script at the application layer, defining a big object to include one or more fields relating to the big object within the database. The organization defines one or more of those fields to be a composite key for the big object. The system receives this script and stores the metadata information relating to the organization's object, generating a metadata model of the big object and its attributes including composite key. The system also writes the metadata to new tables specific to the organization within an existing relational database, such as Oracle. The organization attempts to query data relating to the big object, and the system reads that data and, if a representation does not already exist in the database, automatically generates a multi-tenant object in a data definition script understood by the shared, multi-tenant non-relational database that maps the big object onto the database. The system then defines the composite key for the big object based on the metadata. In this way, the system bridges the way objects are represented to the underlying physical database. In some implementations, the composite key is a composite primary key. In some implementations, the composite key is a composite secondary key which is defined in addition to a composite primary key. In some implementations, a composite primary key and a composite secondary key can both consist of multiple fields and can both arrange data in a non-relational database such that it can be retrieved faster.

Some of the disclosed techniques can be implemented to provide for making the representation of platform object metadata, including composite primary or secondary keys, available through APIs, allowing for organizations to programmatically determine which queries are allowed or not allowed based on which fields are part of the index. First, a "describe" call is made for a big object by the organization, requesting a description of that big object. The system looks up the object and determines that it's a big object. Responsive to that determination, the system retrieves the index metadata for the big object. A caching process then begins: for each of the fields, the system determines whether the field is part of the composite key; sets the sortable and filterable fields correctly; and serializes to set the script information. The composite key is then ordered in a contiguous order. The system then provides the full information for use within an API.

Some of the disclosed techniques can be implemented to provide for dynamically provisioning access rights to a subset of a shared table to one or more tenants within a multi-tenant non-relational database system, via access controls. A standard schema is shared across all tenants of the shared table, using non-relational objects. The schema is configurable such that segments can be provisioned to specific tenants at the application layer, giving them access and permission rights to different sets of non-relational objects very quickly within the system. One organization can have access to certain columns of the shared schema for its data requirements, while another organization can have access to other columns.

Some of the disclosed techniques can be implemented to provide for serving an organization or entity queries relating to multi-tenant, non-relational big objects in synchronous fashion during runtime. This allows for the efficient identification of records from potentially billions without scanning (i.e., reading from disk), with data retrieved quickly in seconds or minutes in real time or substantially real time, due to quickly determining where records are located. The system can efficiently locate records and tenant data within potentially thousands of organizations, leading to quicklyserviced queries. First, a query is received from a user related to a data object. The system determines that the data object is a non-relational platform object. The system then retrieves an existing metadata model of that non-relational data object, the metadata model having information relating to fields of the data object. The system determines that the user query includes a filter condition, and that this filter condition has fields defined in a primary key without gaps. A filter condition is a condition within the user query which is required to be satisfied in order for a record to be included in a subset of filtered records. The system then processes the request during runtime of the database, in synchronous fashion with additional requests. Finally, the system provides the response query to the user.

Applying some implementations of the disclosed techniques, an alternative scenario to that described above is provided. In this alternative scenario, Acme is able to define a composite primary key for their custom object. Acme defines multiple fields within an XML-like script for object definitions and attributes, and selects two fields to be the composite primary key for the object. The system receives this script, then generates a metadata model for the custom object, including its attributes and composite primary key. The system then writes the metadata to tables. Acme attempts to query data relating to their custom object using the primary key fields, and the system generates a data definition script that maps the object onto a shared multi-tenant non-relational database. The system then defines the primary key for the big object based on the metadata.

In addition, Acme can see a representation of the object's metadata, including composite primary key, via an API "describe" call. When such a call is made to request a description of the custom object, the system determines that it's a non-relational custom object, and then retrieves the index metadata for the object. A caching process then begins, with the primary key being ordered in a contiguous order. The full information is then provided to Acme to view and use.

Another benefit to Acme is the ability to query the object in synchronous fashion during runtime, allowing for the simultaneous querying of many rows of data quickly. Acme queries the custom object, and the system determines it is a non-relational custom object. The system then retrieves an existing metadata model of the object, including composite primary key fields, then processes the request during runtime of the database, in synchronous fashion with additional requests. The query is then returned to Acme in a short time.

In some but not all implementations, the disclosed methods, apparatus, systems, and computer-readable storage media may be configured or designed for use in a multi-tenant database environment or system.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for updating and managing multi-tenant non-relational database schemas, in accordance with some implementations. System 100 includes a variety of different hardware and/or software components which are in communication with each other. In the non-limiting example of FIG. 1, system 100 includes at least one enterprise server 104, at least one client system 108, at least one non-relational database 112, and at least one virtual database 116.

Non-relational database 112 can allow for storage and retrieval of large sets of data. The non-relational database 112 can be a database implemented in HBase or other non-relational database management system. This database can include one or more records for each of a plurality of enterprises (also referred to as organizations, or tenants.) In some implementations, the database can include one or more shared tables, in which multiple enterprises have records in the same table, and share many of the same standard objects and columns for their records. In some implementations, each enterprise is associated with a tenant_id that, as part of the composite key. provides unique identification for that particular enterprise in the non-relational database 112. For example, the entity Acme may have a tenant_id of "123" along with a name of the tenant and other pieces of information which, in combination, uniquely identifies Acme as associated with a record or object.

The non-relational database 112 has one or more shared tables which take the form of a distributed, linearly scalable, consistent key-value store. In a key-value store, data within a row is grouped by one or more columns. Columns impact the physical arrangement of data stored in the database. Columns are defined based on one or more objects within the database system. Rows need not all contain the same columns. Each row can represent one record within the shared table, and rows can be sorted and queried through a composite key which is a field that uniquely identifies that row. One example of a composite key is a tenant_id which uniquely identifies a tenant of the shared table. Rows can also be sorted and queried through a composite key, which may be one or more fields that uniquely identify one or more rows of the shared table. In some implementations, the composite key may be defined by one or more users of the shared table. In some implementations, the composite key is a composite primary key, which is a primary key of the shared table that consists of two or more columns. In some implementations, a composite secondary key can be defined in addition to the composite primary key. In some implementations, a composite secondary key can consist of candidate fields or candidate keys for the primary key that were not defined for the primary key. The composite secondary key also consists of two or more columns, and can consist of multiple fields. As with the composite primary key, the composite secondary key can arrange data in a non-relational database such that it can be retrieved faster. In some implementations, the non-relational database 112 may work in conjunction with one or more applications that provide the non-relational database 112 with the functionality of a relational database. For example, it may provide the appearance of a relational database, structured schema, data types, and SQL querying. One example of such an application is Phoenix, which may work in conjunction with HBase and one or more drivers to provide relational features to HBase non-relational databases.

Virtual database 116 is a database that exists at an application level in system 100. In some implementations, the virtual database 116 may be running within or in conjunction with one or more software applications. The virtual database 116 differs from the non-relational database 112 in that data is not stored in a physical or low-level database. Instead, data can be stored virtually in the application layer or in a local or remote storage, through semi-structured sources and other ways outside of the typical relational or non-relational database storage methods. Since the virtual database 116 does not store data at the low level of traditional databases, it is not as limited in terms of schema management and modification. The structure of a virtual database may be quickly changed at the application layer.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the non-relational database 112 or the virtual database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed.

Figure 2:
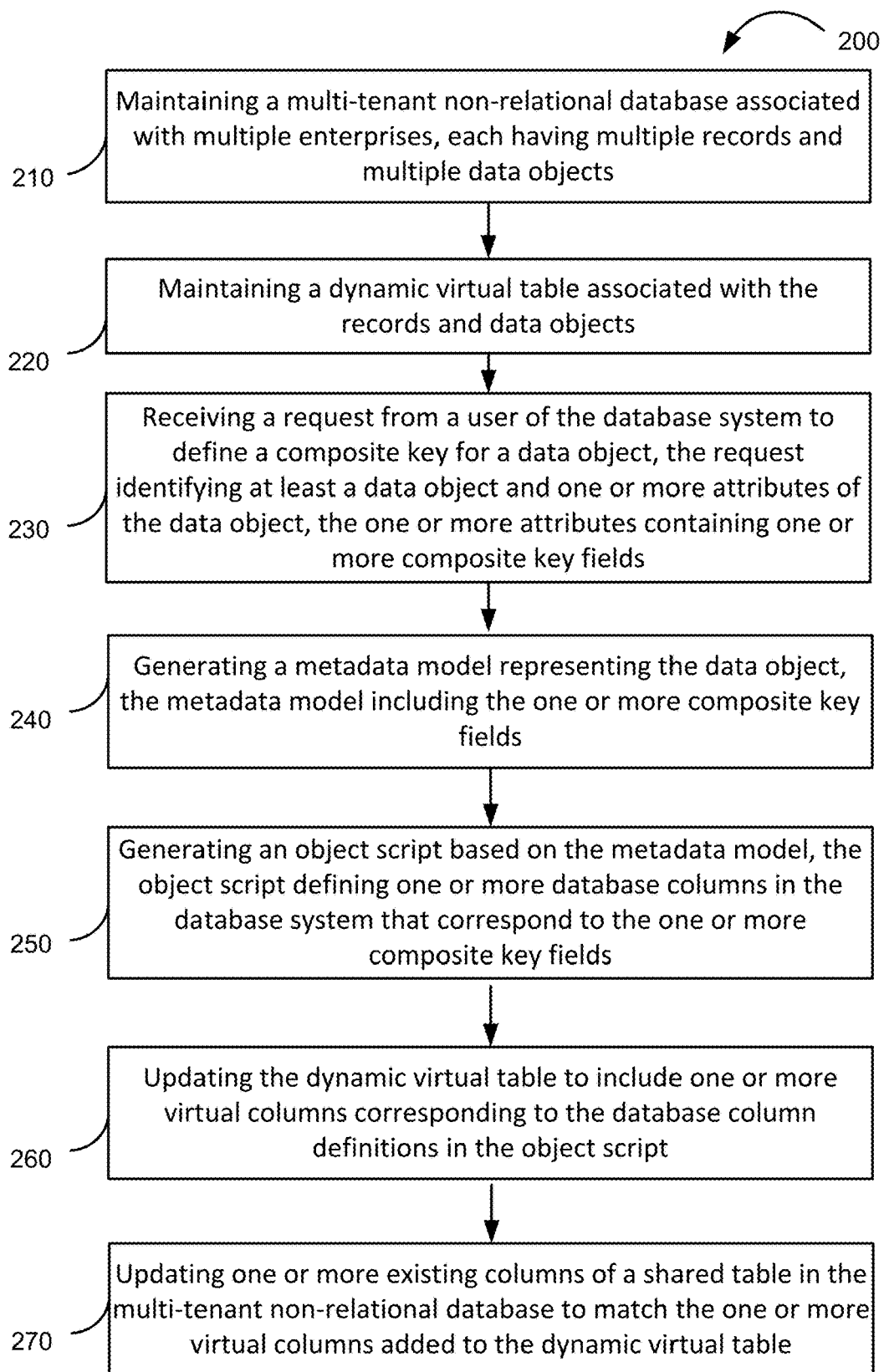
FIG. 2 shows a flowchart of an example of a method 200 for providing composite keys in multi-tenant non-relational database schemas, performed in accordance with some implementations

FIG. 2 shows a flowchart of an example of a method 200 for updating and managing database schemas in a multi-tenant non-relational database system, performed in accordance with some implementations. Method 200 and other methods described herein may be implemented using system 100 of FIG. 1, although the implementations of such methods are not limited to system 100.

At block 210, system 100 maintains a multi-tenant non-relational database 112 associated with multiple enterprises, each having multiple records and multiple data objects. In some implementations, the multiple enterprises are each users of the system 100 and may be able to store and process data in the form of records. The records may be part of a shared table of the non-relational database 112. In some implementations, each record takes the form of a row of the shared table, with a number of columns representing objects. In some implementations, the number, type, and size of columns may vary depending on the enterprise associated with the record and the data objects of that enterprise. In the case of standard data objects, columns denoting attributes of the standard object may appear for all enterprises, or a designated permission set of enterprises of the shared table. For example, a standard object "User_Profile" may be designated to be accessed by all enterprises of the shared table, with attributes Username, User_Age, and User_Location associated with the User_Profile object. Each of these attributes has a column in the shared table that appears for every record of every enterprise. In some implementations, custom objects may be designated for a limited set of enterprises. For example, if Acme has an Acme_User custom object made specifically for its purposes, then only Acme's records may include the Acme_User object and associated columns in its records. Thus, some enterprises may have access to different columns in the table than other enterprises, and some records (and therefore rows) may include different columns than other records.

In some implementations, each tenant or enterprise of the multi-tenant non-relational database 112 is associated with an enterprise identification (enterprise ID) that, in combination with some other data, uniquely identifies the enterprise. In some implementations, the enterprise identification may be a unique number or string of alphanumeric characters. In some implementations, each row (and record) of the shared table in the non-relational database 112 has a column for the enterprise ID, which may be named, for example, "tenant_id", "enterprise_id" or "org_id". This enterprise ID is a leading part of a row key, and in turn is a leading part of a composite key, which consists of other fields defined by a given enterprise of the shared table. The records of the shared table may then be sorted by a combination of the enterprise_id and one or more other row keys, and may be queried based on these row keys. In this way, each record is easily sorted, searched, and retrieved based on the enterprise associated with that record.

At block 220, the system maintains a dynamic virtual table associated with the records of the multi-tenant non-relational database 112. The dynamic virtual table may be part of the virtual database 116 of system 100. In some implementations, the dynamic virtual table is part of an application in the system 100, or functions in conjunction with an application. In some implementations, a subset of all of the records stored in the multi-tenant relational database 112 may be stored in the dynamic virtual table. In some implementations, an enterprise ID as described above may also be designated as a row key for each of the virtual table's records for sorting and querying.

At block 230, the system receives a request from a user of the non-relational database 112 to define a composite key for a data object within the database. In some implementations, the request identifies at least a data object and one or more attributes of the data object. In some implementations, the attributes contain one or more composite key fields. In one of more implementations, the system 100 receives a request to define a composite primary key or a composite secondary key, and the attributes contain one or more composite primary key fields or composite secondary key fields, respectively. In some implementations, system 100 detects that the request is a modification request related to modifying one or more fields of the data object. In some implementations, the request from the user comes from the client system 108. In some implementations, the request comes from the enterprise server 104. A user may be an enterprise or representative member of an enterprise, the developer or maintainer of the system 100, the developer or maintainer of the multi-tenant non-relational database 112, or some other user. In some implementations, the request takes the form of one or more documents in a declarative language. For example, the request may be an XML or JSON file. In the case of an XML file, the file may include several script instructions or declarative definitions pertaining to the data object. As one example, the request may define fields named "Account_c", "Game_Platform_c", and "Play_Data_c" as primary key fields with a "PRIMARY" type value. This request may take a form similar to the following XML-like script:

```
<indexes>
    <type>PRIMARY</type>
    <fullName>CustomerInteractionsPK</fullName>
    <fields>
        <name>Account_c</name>
        <sortDirection>DESC</sortDirection>
    </fields>
    <fields>
        <name>Game_Platform_c</name>
        <sortDirection>ASC</sortDirection>
    </fields>
    <fields>
```

-continued

```
        <name>Play_Date_c</name>
        <sortDirection>DESC</sortDirection>
    </fields>
</indexes>
```

By designating a primary key, records may be sorted and queries based on the primary key field or fields identified. In some implementations, the primary key designated is the enterprise ID attribute for the data object. For example, an org_id field in combination with another field may be the primary key for a shared table, and records in the table may be sorted based on those fields. Thus, records for ACME would be sorted such that they appear prior to records for ENTERPRISE.

In some implementations, an object type can also be identified within the request. An object type is an indicator of the specific type of the object being referred to within the system 100. Examples of object types may be accounts, leads, opportunities, event logs, or chat feeds. In some implementations, the attributes of the data object may be custom attributes created or defined by an enterprise or user of system 100.

In some implementations, the system 100 provides a user interface for defining the composite key for the data object. Rather than manually entering information and definitions in an XML-like script, the user interface may provide a method to defining the composite key that can include, for example, selecting fields from a drop-down box and opting to designate them as composite key fields. In some implementations, the user interface provides a method for defining a composite primary key, a method for defining a composite secondary key, or both.

At block 240, the system 100 generates a metadata model representing the data object. The metadata model includes the one or more composite key fields as defined or designated in the request at block 230. In some implementations, the system 100 generates a metadata model using the script defining the composite key fields and attributes of the data object. In some implementations, the metadata model is cached by the system 100. In some implementations, this metadata model is stored in one or more databases for object metadata or data objects.

At block 250, the system generates a data definition script based on the metadata model. The data definition script defines one or more database columns in the database system that correspond to the request's data object and attributes of the data object. In some implementations, the data definition script may take the form of a data object definition, or data dictionary capable of being read by one or more applications of the system 100. A data dictionary is a file or script that defines the organization of a data object. In some implementations, the data definition script is derived from the metadata model. For example, in some implementations, upon receiving the user request in the form of an XML file defining a data object through metadata, the system 100 processes the request, uses the metadata and data object definitions to generate a metadata model representation of the data object, then uses this metadata model during runtime to generate a data definition script in the form of a data dictionary. In some implementations, the data definition script defines the data object and the one or more attributes of the data object as database structures in a data description language associated with the multi-tenant non-relational database. For example, the non-relational database 112 may work in conjunction with an application such as Phoenix that allows statements or definitions to be read and performed on the non-relational database 112. An application may be accordingly configured to convert the data object request into a series of statements that define the object in terms readable by the non-relational database.

At block 260, the system updates the dynamic virtual table to include one or more virtual columns corresponding to the database column definitions in the data definition script. Since the dynamic virtual table of virtual database 118 operates in the application layer rather than the database layer, it does not have the strict requirements and limitations of updating a physical database schema. Instead, the dynamic virtual table may add one or more columns, delete one or more columns, or otherwise modify the virtual database schema without restrictions.

At block 270, the system updates one or more existing columns of a shared table in the multi-tenant non-relational database 112 to match the one or more virtual columns added to the dynamic virtual table. In some implementations, one or more columns are modified, added to or removed from a physical non-relational table, representing the new data object and its attributes. In some implementations, data may be written to the shared table regarding the one or more existing columns being updated. In some implementations, updating the columns includes one or more operations to be performed in a non-relational database. Since a non-relational database such as HBase allows for a key-value store in which multiple configurations of varying columns can be present for different rows, updating the database in this manner does not violate the properties of the physical non-relational table. At the database layer, rather than there being explicitly defined data types for each column, like there would be in a relational database, instead there are bytes, and any column may be redefined at the application layer.

In some implementations, the system adds one or more records to the shared table in the multi-tenant non-relational database. In some implementations, the addition of one or more records may be caused by an enterprise storing data that has been captured in one or more events. The added records are associated with the one or more existing columns or data objects of the shared table. For example, an Object_ID field in a record may determine which data object corresponds to the record.

FIG. 3 shows an example of a composite primary key within a data object, in accordance with some implementations. An example screenshot of a data object is pictured. The screenshot depicts a page of a database environment that is displaying information about a data object. In some implementations, including the example screenshot, the data object is a custom data object that one or more entities or users of the multi-tenant database has defined. Title 310 shows the title of the data object. Index fields number 320 shows the number of index fields that have been defined which constitute the composite primary key. In the example, two custom index fields have been defined for a data object by a user.

Information 330 displays information about the data object. Both a label and a name are displayed. In this example, the label and name are identical. A type is also displayed, indicating which type of key is being used for the composite key. In the example, the type is set to "Primary", indicating that the composite key is a composite primary key. A parent of the object is also displayed, and a namespace prefix, in this case "custidx7". System information 340 is also displayed, showing which of the one or more users or entities has created the data object, if any. System information 340 also shows which of the one or more users or entities modified the data object last, and what date and time the modification last occurred.

Custom index fields 350 show the index fields or primary key fields that have been custom defined by the one or more users or entities. Index fields with field label "TextField0" and "DateTimeField2" have been defined as index fields, together constituting the composite primary key of the data object. Their API names are displayed, along with a sort direction. The sort direction for the index fields may either be descending or ascending, which affects the performance and efficiency of querying the data.

FIG. 4 shows an example of query statements for data objects with composite primary keys, in accordance with some implementations. In some implementations, query statements may be processed as part or all of a request to query data. Query statement 410 applies to a data object Phone_Book_b, which has index fields or primary key fields custom defined by one or more entity users. The index fields defined in this data object are LastName_c, FirstName_c, and PhoneNumber_c. In some implementations, a query statement involving index fields must be built starting from the first field defined in the index, without gaps between the first field and last field in the query. In the example query statement 410, all three primary key fields are selected from the data object, where the primary key fields are all queried to have specific values. Since the query statement SELECTS all three index fields, WHERE all three index fields are queried for values without gaps in the fields, the query statement is valid. In query statement 420, since the query SELECTS all three index fields, WHERE the first and second index fields are queried for values without gaps between the first and second index fields, the query is valid. In query statement 430, in contrast, the query SELECTS all three index fields, WHERE the first index field and third index field are queried for values. Since there is a gap between the first and third index fields, with FirstName_c missing in between, the query statement is not valid.

Figure 5:
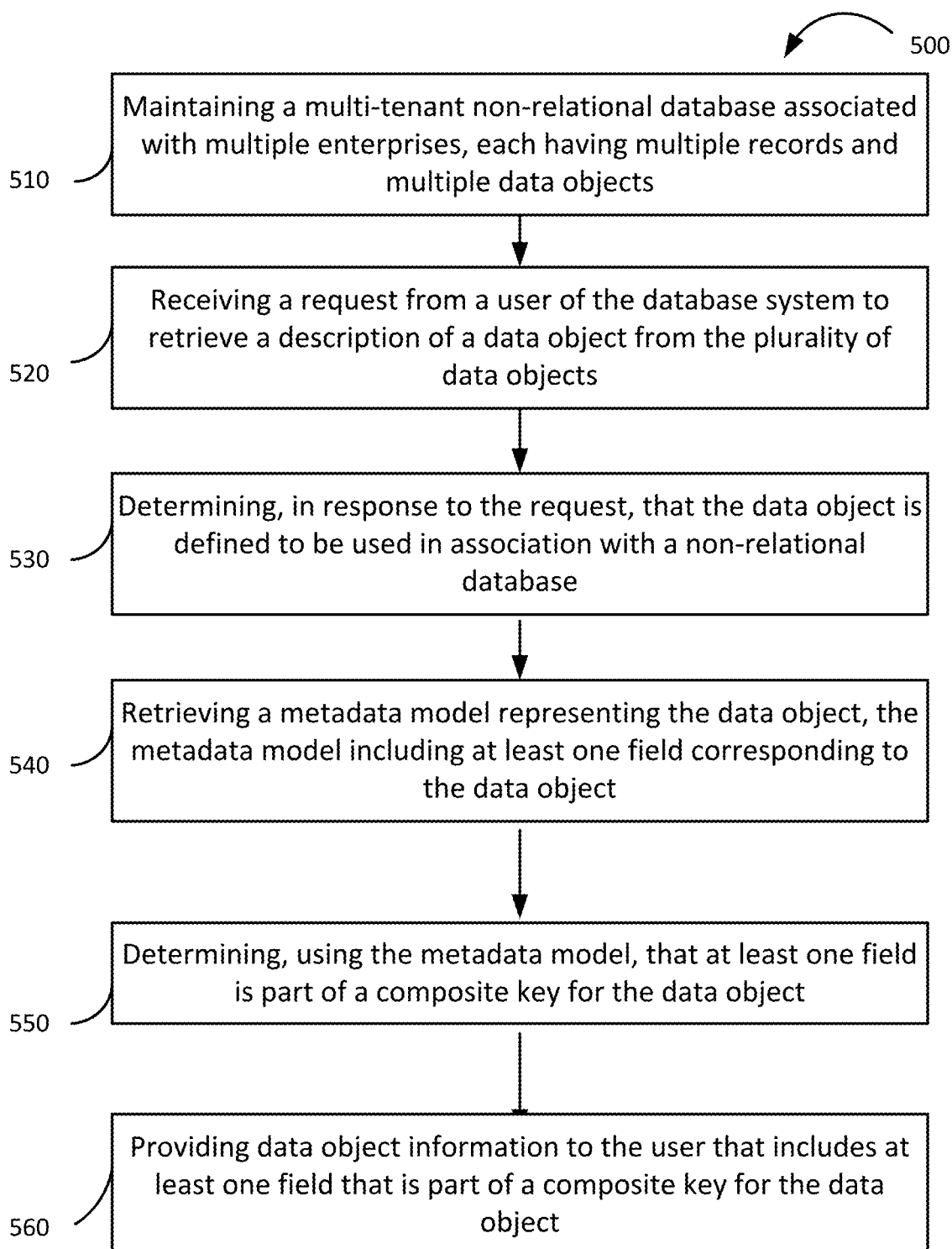
FIG. 5 shows a flowchart of an example of a method 500 for providing API representation of multi-tenant non-relational objects.

FIG. 5 shows a flowchart of an example of a method 700 for providing API representation of multi-tenant non-relational objects, in accordance with some implementations. Method 500 and other methods described herein may be implemented using system 100 of FIG. 1, although the implementations of such methods are not limited to system 100.

At block 510, system 100 maintains a multi-tenant non-relational database 112 associated with multiple enterprises, each having multiple records and multiple data objects. In some implementations, the multiple enterprises are each users of the system 100 and may be able to store and process data in the form of records. The records may be part of a shared table of the non-relational database 112. In some implementations, each record takes the form of a row of the shared table, with a number of columns representing objects. In some implementations, the number, type, and size of columns may vary depending on the enterprise associated with the record and the data objects of that enterprise. In the case of standard data objects, columns denoting attributes of the standard object may appear for all enterprises, or a designated permission set of enterprises of the shared table. In some implementations, each tenant or enterprise of the multi-tenant non-relational database 112 is associated with an enterprise identification (enterprise ID) that uniquely identifies the enterprise. In some implementations, the enterprise identification may be a unique number or string of alphanumeric characters.

At block 520, the system 100 receives a request from a user of the non-relational database 112 to retrieve a description of a data object from the plurality of data objects. In some implementations, the request may take the form of a functionality or statement such as "describe" within an API associated with the database environment. For example, a user may submit a request in the statement "Describe dataobject123". The system 100 receives the request and the associated name of the data object.

At block 530, the system 100 determines, in response to the request in block 520, that the data object is defined to be used in association with a non-relational database. In some implementations, system 100 determines this by verifying that the data object is a non-relational data object that is compatible with the multi-tenant database of the database environment. In some implementations, an XML representation of the data object is converted into an internal metadata representation of the data object.

At block 540, the system 100 generates a metadata model representing the data object. The metadata model includes at least one field corresponding to the data object. In some implementations, the system 100 generates a metadata model using the script defining the composite key fields and attributes of the data object. In some implementations, the metadata model is cached by the system 100. In some implementations, this metadata model is stored in one or more databases for object metadata or data objects.

At block 550, the system 100 determines that at least one field is part of a composite key for the data object. In some implementations, system 100 determines this by using the metadata model to locate the defined custom index fields associated with the data object. In some implementations, if no custom index fields are returned, or fields are defined but none are part of a custom index field, then no data object information is provided to the user. In some implementations, the system 100 determines that at least one field is part of a composite primary key. In some implementations, the system 100 determines that at least one field is part of a composite secondary key.

In some implementations, the system 100 configures one or more fields such that the user can filter the data object based on the fields. In some implementations, the system 100 sets an attribute related to filterability for the field or fields to be true, such that the user or all users can filter the field in various ways. For example, a user may be able to construct a query such that the filter of a field "NumberOfSales" can be a range.

In some implementations, the system 100 configures at least one field to be sorted according to one or more criteria. In some implementations, the field is a composite key field. In some implementations, the system 100 sets an attribute related to sortability for the field or fields, such that the user or all users can sort the field in ascending or descending order. In some implementations, the sorting is performed in contiguous fashion.

In some implementations, system 100 caches the metadata model. In some implementations, the caching includes storing the metadata model in one or more databases. In some implementations, system 100 searches for a cached version of the metadata model to retrieve, and if no cached version exists, then a metadata model is constructed or generated from available definitions and data, then cached. In some implementations, during the cache build from the previously stored metadata, system 100 identifies fields which are part of the composite key and marks them as sortable and filterable. In some implementations, system 100 additionally sets information related to defining index fields and attributes of the data object, sets the composite key to be ordered in contiguous order, and/or stores the information and definitions for the data object in one or more databases.

At block 560, the system 100 provides data object information to the user that includes at least one field that is part of a composite key for the data object. In some implementations, the system 100 provides the data object information to the user by displaying a user interface associated with the database environment, with one or more pieces of data object information displayed. In some implementations, the data object information includes the composite key information, and attributes relating to the composite key, including composite key fields, composite key labels, and whether the composite keys are sorted by ascending or descending order. In some implementations, the attributes relate to sortability, type, uniqueness, filterability, aggregatability, permissionability, and updatability of the composite key fields. In some implementations, additional attributes may relate to whether the composite key is a composite primary key and/or whether the composite key is a composite secondary key.

FIG. 6 shows an example of a representation of data object information provided to a user of a database environment, in accordance with some implementations. In some implementations, the example depicts a screenshot of a user interface that provides data object information to the user via a user device. The data object information includes one or more attributes, and one or more fields constituting a composite primary key. One of the index fields is displayed with its attributes, including label, name, length, filterability, sortability, permissionability for whether permissions may be assigned with the index field, type of index field, uniqueness, and updateability.

Figure 7:
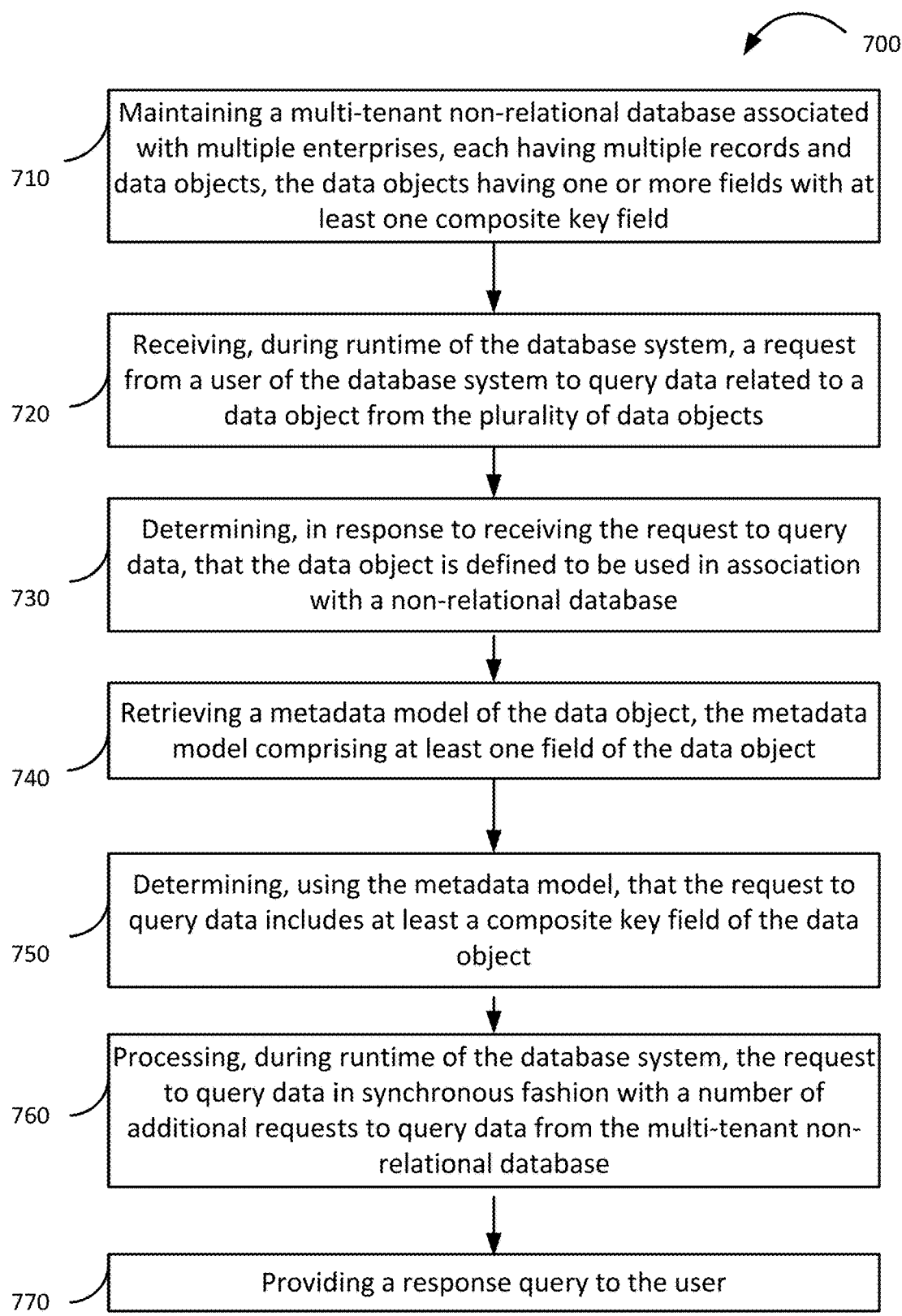
FIG. 7 shows a flowchart of an example of a method 700 for providing run-time querying of multi-tenant non-relational objects.

FIG. 7 shows a flowchart of an example of a method 700 for providing run-time querying of multi-tenant non-relational objects. Method 700 and other methods described herein may be implemented using system 100 of FIG. 1, although the implementations of such methods are not limited to system 100.

At block 710, system 100 maintains a multi-tenant non-relational database 112 associated with multiple enterprises, each having multiple records and multiple data objects. The data objects each have one or more fields with at least one primary key field defined. In some implementations, the multiple enterprises are each users of the system 100 and may be able to store and process data in the form of records. The records may be part of a shared table of the non-relational database 112. In some implementations, each record takes the form of a row of the shared table, with a number of columns representing objects. In some implementations, the number, type, and size of columns may vary depending on the enterprise associated with the record and the data objects of that enterprise. In the case of standard data objects, columns denoting attributes of the standard object may appear for all enterprises, or a designated permission set of enterprises of the shared table At block 720, the system receives a request from a user of the non-relational database 112, during runtime of the database system, to query data related to a data object from the plurality of data objects. In some implementations, the request to query data may take the form of SQL or another query language. In some implementations, the query includes one or more composite primary key fields and/or composite secondary key fields from the composite primary key and/or composite secondary key. In some implementations, the data object is a custom data object that has been defined by one or more entities or users. In some implementations, the user may perform various operations with respect to the composite primary key fields or composite secondary key fields, including filtering and sorting the fields in different ways.

At block 730, the system 100 determines, in response to receiving the request to query data, that the data object is defined to be used in association with a non-relational database. In some implementations, system 100 determines this by verifying that the data object is a non-relational data object, and has been defined using language or XML statements that are compatible with the multi-tenant database of the database environment.

At block 740, the system 100 retrieves a metadata model representing the data object. The metadata model includes at least one field corresponding to the data object. In some implementations, the system 100 retrieves a metadata model via a script defining the fields and attributes of the data object. In some implementations, one or more of those fields are composite key fields. In some implementations, the system 100 retrieved from one or more databased associated with data object metadata.

At block 750, the system 100 determines that at least one field is part of a composite key for the data object. In some implementations, system 100 determines this by using the metadata model to locate the defined custom index fields associated with the data object. In some implementations, the system 100 determines that at least one field is part of a composite primary key. In some implementations, the system 100 determines that at least one field is part of a composite secondary key.

At block 760, the system 100 processes the request to query data during runtime query of the database system. The request is processed in synchronous fashion. Synchronous processing of queries means that one or more queries in the multi-tenant non-relational database are processed simultaneously. This may occur when users must query large amounts of data stored in the multi-tenant non-relational database, such as millions or billions of records, and when users more amounts of data queries simultaneously with performance-intensive processing than is available merely using synchronous SQL.

At block 770, a response query is provided to the user.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 8A:
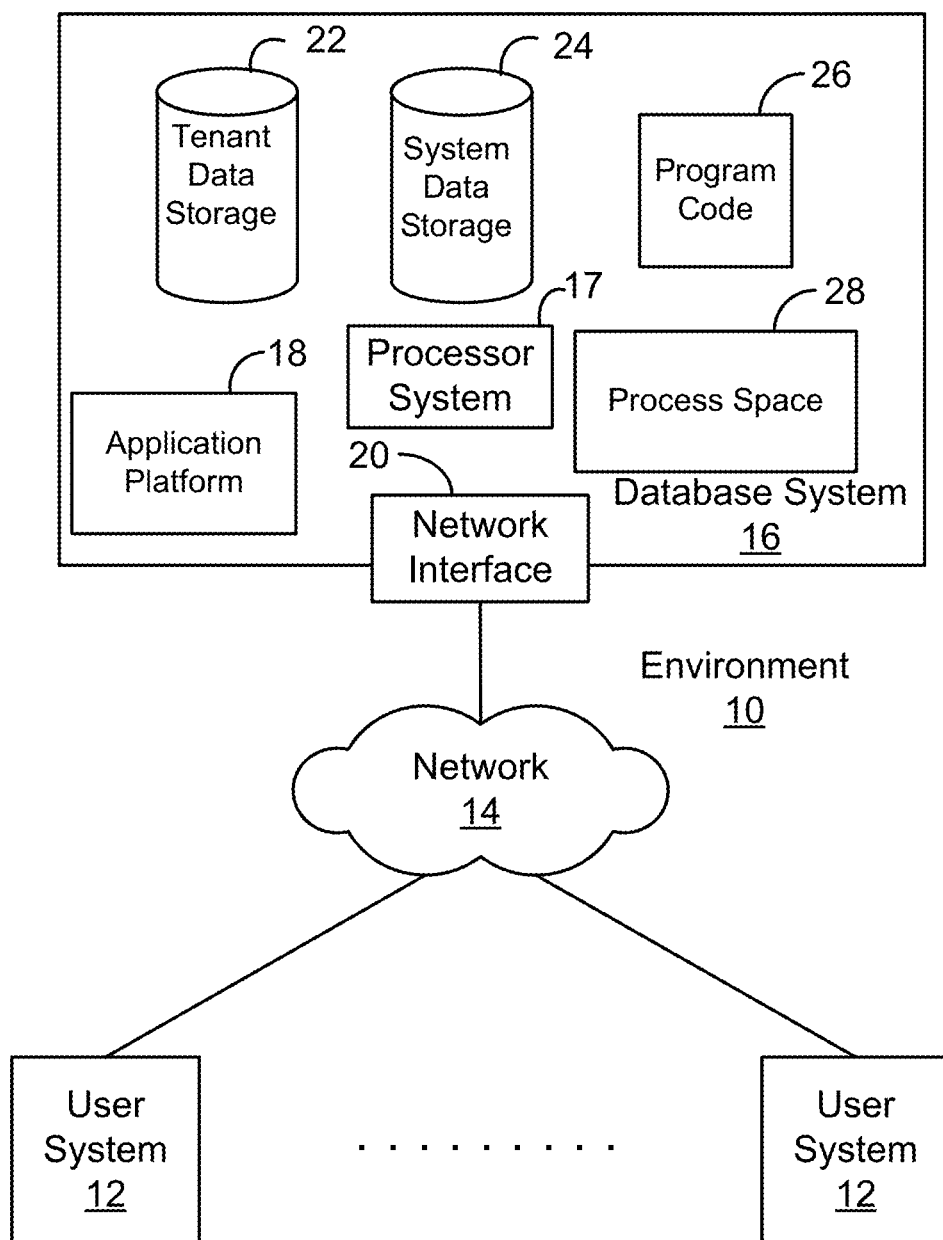
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

Figure 8B:
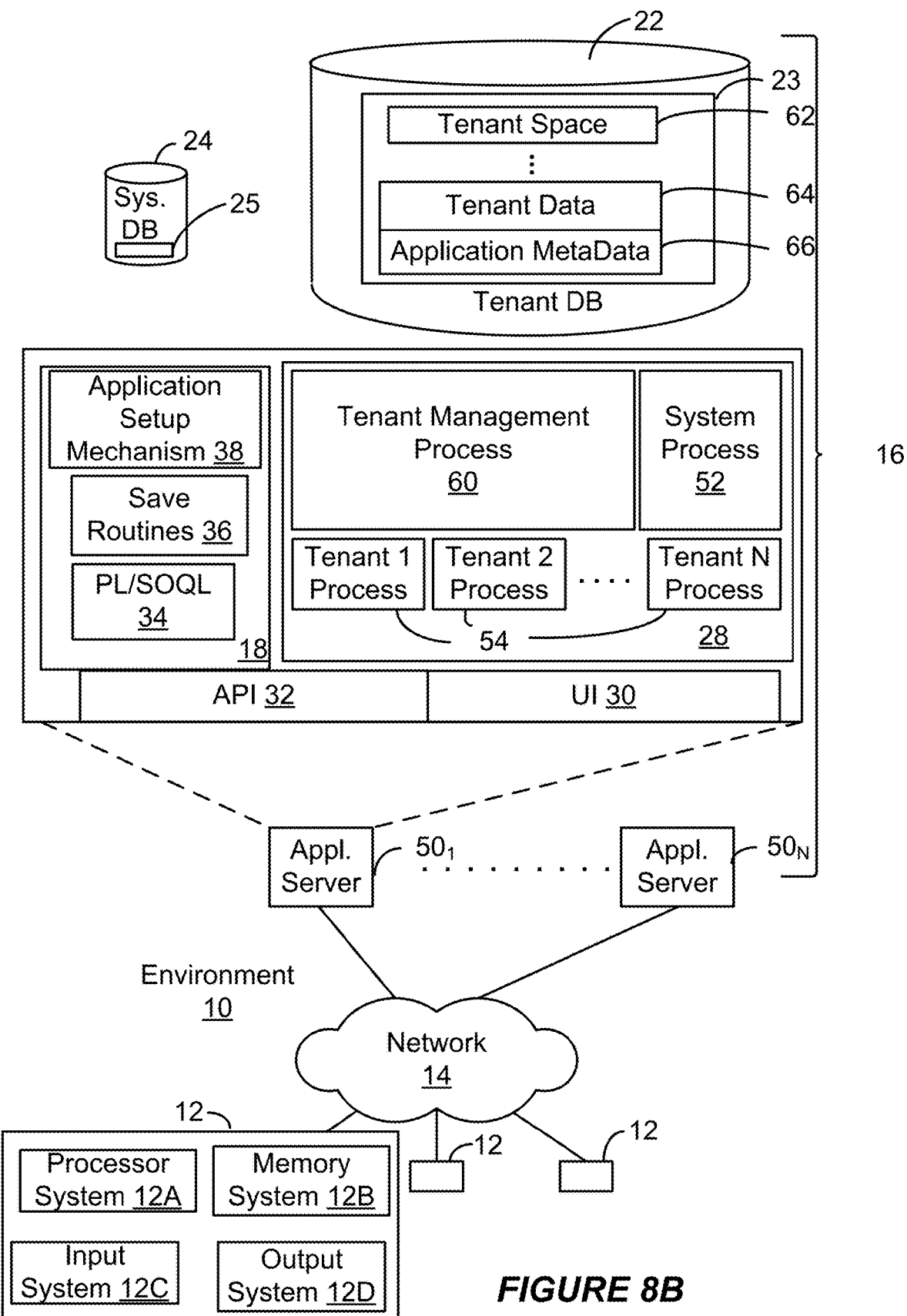
FIG. 8B shows a block diagram of an example of some implementations of elements of FIG. 8A and various possible interconnections between these elements.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
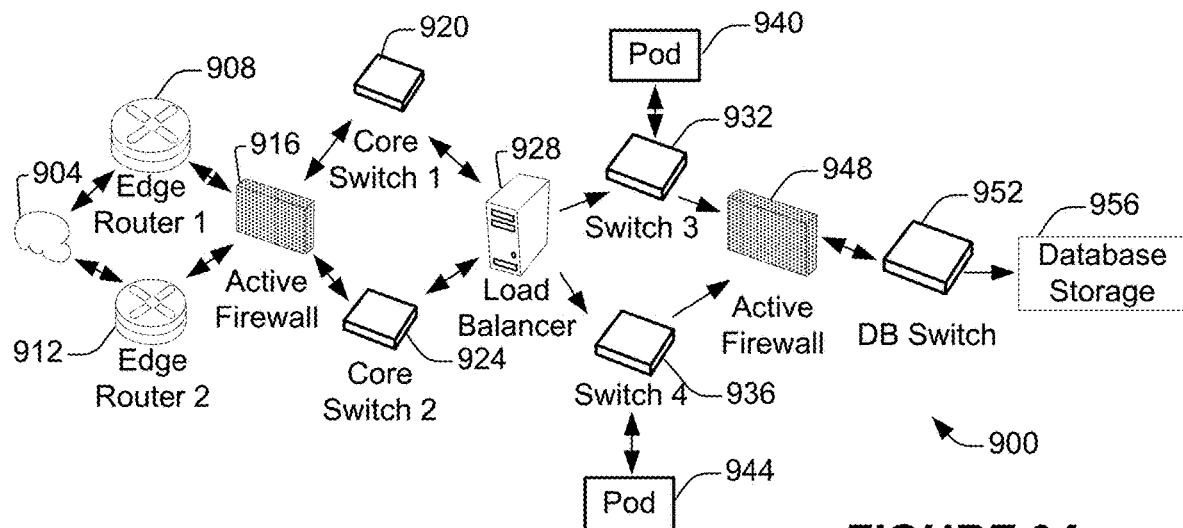
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
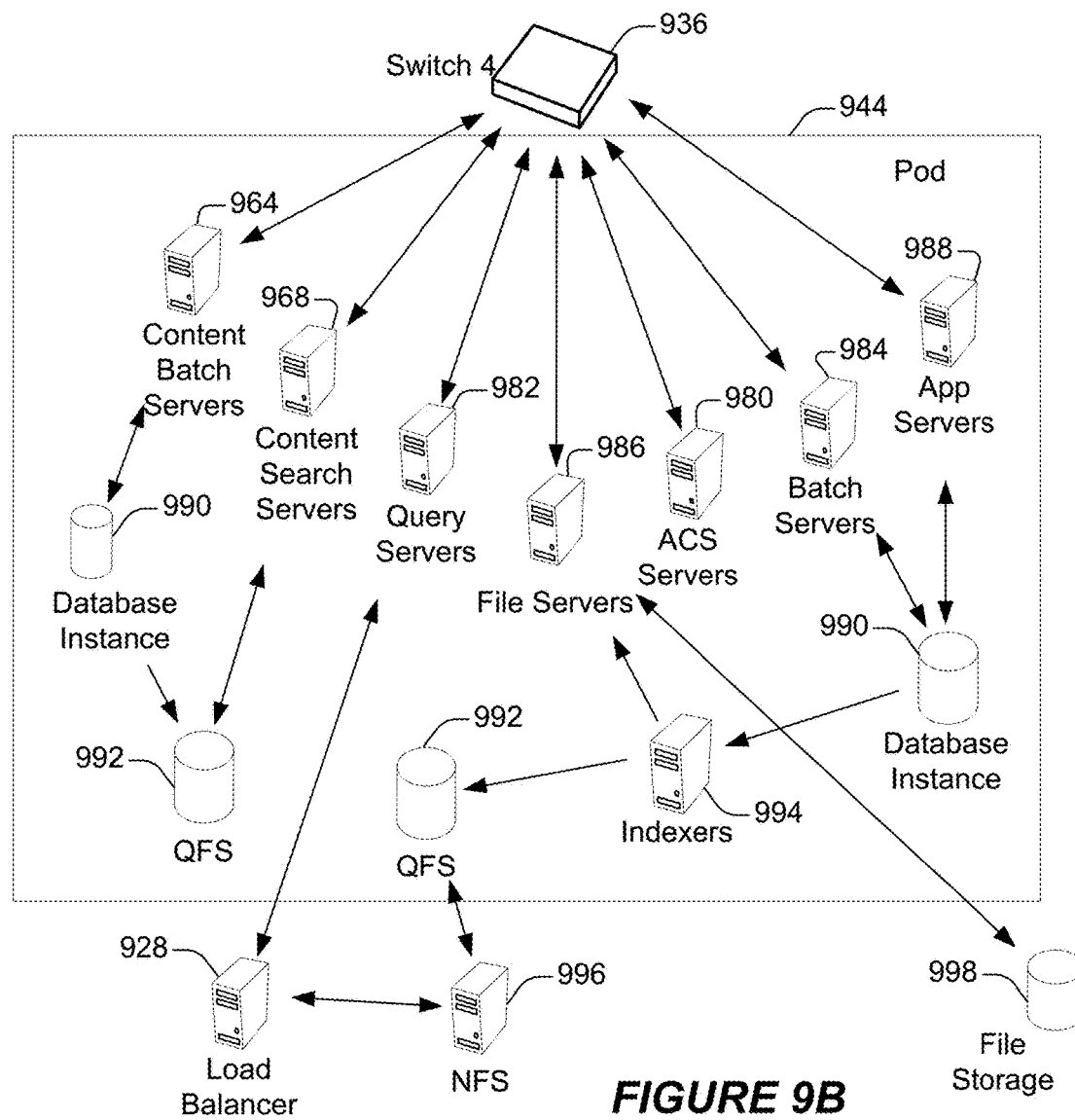
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOB s). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system, the database system configurable to cause:
   accessing a multi-tenant non-relational database associated with a plurality of enterprises, the multi-tenant non-relational database identifying a plurality of records and a plurality of data objects for each of the enterprises;
   maintaining a dynamic virtual table associated with the records and the data objects;
   processing a request from a user of the database system to define a composite key for one of the data objects, the request identifying at least the data object and one or more attributes of the data object, the one or more attributes comprising at least one composite key field;
   generating a metadata model representing the data object, the metadata model comprising the at least one composite key field;
   generating a data definition script in accordance with the metadata model, the data definition script defining one or more database data sets in the database system that correspond to the at least one composite key field, the data definition script comprising a data object definition or a data dictionary configured to define an organization of the data object;
   updating, using the data definition script, the dynamic virtual table to include one or more virtual data sets corresponding to the one or more database data sets defined by the data definition script; and
   updating one or more existing data sets of a shared table in the multi-tenant non-relational database to match the one or more virtual data sets and represent the data object.

2. The system of claim 1, wherein the composite key for the data object is one of: a composite primary key, or a composite secondary key.

3. The system of claim 1, wherein the data object is a custom data object associated with one of the enterprises, and the user is associated with the enterprise.

4. The system of claim 1, the database system further configurable to cause:
   displaying a user interface at a display of a client device, the user interface including a plurality of interactive elements associated with defining one or more composite key fields for a data object.

5. The system of claim 1, wherein generating the data definition script comprises automatically defining the composite key for the data object as one or more database structures in a data description language associated with the multi-tenant non-relational database.

6. The system of claim 1, wherein updating the dynamic virtual table comprises at least one of: removing one or more virtual data sets, adding one or more virtual data sets, or modifying the contents of one or more virtual data sets.

7. The system of claim 1, wherein processing the request from the user of the database system comprises detecting a modification request related to one or more fields of the data object.

8. The system of claim 1, wherein updating the one or more existing data sets of the shared table comprises converting one or more database definitions into non-relational metadata.

9. A method comprising:
   accessing a multi-tenant non-relational database associated with a plurality of enterprises, the multi-tenant non-relational database identifying a plurality of records and a plurality of data objects for each of the enterprises;
   maintaining a dynamic virtual table associated with the records and the data objects;
   processing a request from a user of a database system to define a composite key for one of the data objects, the request identifying at least the data object and one or more attributes of the data object, the one or more attributes comprising at least one composite key field;
   generating a metadata model representing the data object, the metadata model comprising the at least one composite key field;
   generating a data definition script in accordance with the metadata model, the data definition script defining one or more database data sets in the database system that correspond to the at least one composite key field, the data definition script comprising a data object definition or a data dictionary configured to define an organization of the data object;

updating, using the data definition script, the dynamic virtual table to include one or more virtual data sets corresponding to the one or more database data sets defined by the data definition script; and updating one or more existing data sets of a shared table in the multi-tenant non-relational database to match the one or more virtual data sets and represent the data object.

10. The method of claim 9, wherein the composite key for the data object is one of: a composite primary key, or a composite secondary key.

11. The method of claim 9, wherein the data object is a custom data object associated with one of the enterprises, and the user is associated with the enterprise.

12. The method of claim 9, further comprising:
causing display of a user interface at a display of a client device, the user interface including a plurality of interactive elements associated with defining one or more composite key fields for a data object.

13. The method of claim 9, wherein generating the data definition script comprises automatically defining the composite key for the data object as one or more database structures in a data description language associated with the multi-tenant non-relational database.

14. The method of claim 9, wherein updating the dynamic virtual table comprises at least one of: removing one or more virtual data sets, adding one or more virtual data sets, or modifying the contents of one or more virtual data sets.

15. The method of claim 9, wherein processing the request from the user of the database system comprises detecting a modification request related to one or more fields of the data object.

16. A computer program product comprising computer-readable program code capable of being executed by one or more processors when retrieved from a non-transitory computer-readable medium, the program code comprising instructions configurable to cause:
accessing a multi-tenant non-relational database associated with a plurality of enterprises, the multi-tenant non-relational database identifying a plurality of records and a plurality of data objects for each of the enterprises;
maintaining a dynamic virtual table associated with the records and the data objects;
processing a request from a user of a database system to define a composite key for one of the data objects, the request identifying at least the data object and one or more attributes of the data object, the one or more attributes comprising at least one composite key field;
generating a metadata model representing the data object, the metadata model comprising the at least one composite key field;
generating a data definition script in accordance with the metadata model, the data definition script defining one or more database data sets in the database system that correspond to the at least one composite key field, the data definition script comprising a data object definition or a data dictionary configured to define an organization of the data object;
updating, using the data definition script, the dynamic virtual table to include one or more virtual data sets corresponding to the one or more database data sets defined by the data definition script; and
updating one or more existing data sets of a shared table in the multi-tenant non-relational database to match the one or more virtual data sets and represent the data object.

17. The computer program product of claim 16, wherein the composite key for the data object is one of: a composite primary key, or a composite secondary key.

18. The computer program product of claim 16, wherein the data object is a custom data object associated with one of the enterprises, and the user is associated with the enterprise.

19. The computer program product of claim 16, the program code comprising instructions further configurable to cause:
displaying a user interface at a display of a client device, the user interface including a plurality of interactive elements associated with defining one or more composite key fields for a data object.

20. The computer program product of claim 16, wherein generating the data definition script comprises automatically defining the composite key for the data object as one or more database structures in a data description language associated with the multi-tenant non-relational database.

* * * * *